United States Patent [19]

Yamamoto

[11] 4,279,760
[45] Jul. 21, 1981

[54] PROCESS AND APPARATUS FOR CONTINUOUS CAKE FILTERATION UNDER PRESSURE

[76] Inventor: Samuroh Yamamoto, 6-2-13-506, Akasaka, Minato-ku, Tokyo, Japan

[21] Appl. No.: 155,035

[22] Filed: May 30, 1980

Related U.S. Application Data

[63] Continuation of Ser. No. 970,907, Dec. 19, 1978, abandoned.

[30] Foreign Application Priority Data

Dec. 27, 1977 [JP] Japan .............................. 52/156712

[51] Int. Cl.³ .......................................... B01D 33/14
[52] U.S. Cl. ................................ 210/784; 210/386; 210/393; 210/402; 210/791
[58] Field of Search ............... 210/386, 393, 396, 397, 210/402, 528, 784, 791, 391; 209/270

[56] References Cited

U.S. PATENT DOCUMENTS

| | | | |
|---|---|---|---|
| 230,029 | 7/1880 | McDermio | 210/386 |
| 2,046,845 | 7/1936 | Raisch | 210/386 |
| 2,534,760 | 12/1950 | Ellila | 210/402 |
| 2,851,161 | 9/1958 | Dahlstrom et al. | 210/784 |
| 2,963,160 | 12/1960 | Wennberg | 210/386 |
| 3,029,948 | 4/1962 | McKay | 210/402 |
| 3,037,632 | 6/1962 | Du Jardin | 210/402 |
| 3,038,789 | 6/1962 | Bennett et al. | 210/386 |
| 3,048,218 | 8/1962 | Gunther | 210/402 |
| 3,282,425 | 11/1966 | Christiani | 210/528 |
| 3,741,388 | 6/1973 | Takahashi | 210/77 |
| 3,743,094 | 7/1973 | Mook | 210/784 |
| 3,971,720 | 7/1976 | Swanson et al. | 210/386 |
| 4,120,911 | 10/1978 | Davidson | 210/77 |
| 4,182,680 | 1/1980 | Carle | 210/784 |
| 4,184,951 | 1/1980 | Wientjens | 210/784 |
| 4,226,715 | 10/1980 | Niederer et al. | 210/402 |

*Primary Examiner*—Frank W. Lutter
*Assistant Examiner*—Gregory N. Clements
*Attorney, Agent, or Firm*—Jordan and Hamburg

[57] ABSTRACT

The present invention utilizes a closed-type vessel comprising a filtering chamber, at least one perforated filter cylinder a portion of which is positioned within the filtering chamber, said filter cylinder being rotatable at any desired speed and having a filtering surface covered with a filter cloth, and a squeezing roll and sealing roll which engage with said filter cylinder through the filter cloth at all times to define a sealing and operating wall. Any sewage to be treated is supplied under pressure to the filtering chamber and filtered through the filter cloth at the filtering surface of the filter cylinder. Filter cake deposited on the filter cloth is continuously transferred to the outer periphery of the squeeze roll and then separated therefrom outside the filtering chamber by any suitable means such as a scraper.

25 Claims, 11 Drawing Figures

PROCESS AND APPARATUS FOR CONTINUOUS CAKE FILTERATION UNDER PRESSURE

This is a continuation of application Ser. No. 970,907, filed Dec. 19, 1978, abandoned.

The present invention relates to a process for continuously separating fine, suspended materials from fluid such as sewage, industrial waste water or chemical plant liquid under pressure and continuously removing the resultant filter cake and an apparatus for carrying out the above process.

There have been generally known various filtration methods for dewatering sludge and other muddy substances, such as pressure filtration, vacuum filtration, centrifugal separation and the like. In the prior art, the pressure filtration has been operated under a batch cycle with the construction thereof being very complicated.

It is an object of the present invention to provide a continuous cake filtration process for continuously separating filter cake from sludge and continuously collecting dewatered cake.

Another object is to provide an apparatus for carrying out the above process which has a relatively simple construction and can accommodate a broader size and property range of fine suspended materials of any waste water or sewage.

In order to accomplish the above objects, the present invention comprises a closed-type vessel defining a filtering chamber, at least one perforated filter cylinder mounted rotatably in the vessel in such a way that at least a portion of the filter cylinder is positioned within the filtering chamber, said filter cylinder having a filtering surface covered with a filter cloth and being engaged by squeezing and sealing rolls through the filter cloth to define a sealing and operating wall which borders between the interior and exterior of said filtering chamber, and means for feeding raw slurry under pressure into said filtering chamber.

In one embodiment of the present invention, the slurry supplying means includes a slurry tank connected with the filtering chamber through duct means which is provided with pressure pump means. In another embodiment of the present invention, the slurry supplying means includes a slurry tank located at a level higher than that of the vessel such that the slurry can be fed to the filtering chamber by means of water pressure. Still another embodiment comprises two or more slurry tanks which can be switched from one to another by any suitable valve means. In this case, compressed air may be used to feed the slurry from one of the slurry tanks under operation to the filtering chamber. The slurry tank may be a settling tank from which the resultant sludge will be fed to the filtering chamber through a duct by any suitable means such as a pressure pump. Preferably, the settling tank may be provided with an agitator located at the bottom thereof adjacent to the inlet of said duct means.

The vessel includes a closure or lid fastened on the top opening thereof. A valve means to relieve pressure may be provided in said closure or may be provided in the side wall of the vessel. An agitator may be also mounted within the filtering chamber of the vessel.

The squeeze roll, which is engaged by the filter cylinder, serves as a cake-removing means onto which the filter cake is transferred from the filter cylinder. The resultant dewatered cake can be removed from the squeeze roll by any suitable scraping means outside the filtering chamber. The squeeze roll may be engaged by an intermediate or press roll onto which the dewatered cake can be further transferred from the squeeze roll. Thus, the filter cake on the filter cylinder can be continuously removed and collected outside the filtering chamber by the squeeze roll during the filtering operation.

The above and other objects of the present invention will now become more apparent, along with the many advantages thereof, from the following description in connection with the accompanying drawings in which.

Prior to describing the embodiments of the present invention, it is to be understood that like numerals indicate corresponding parts in the pressure filters.

Figure 1:
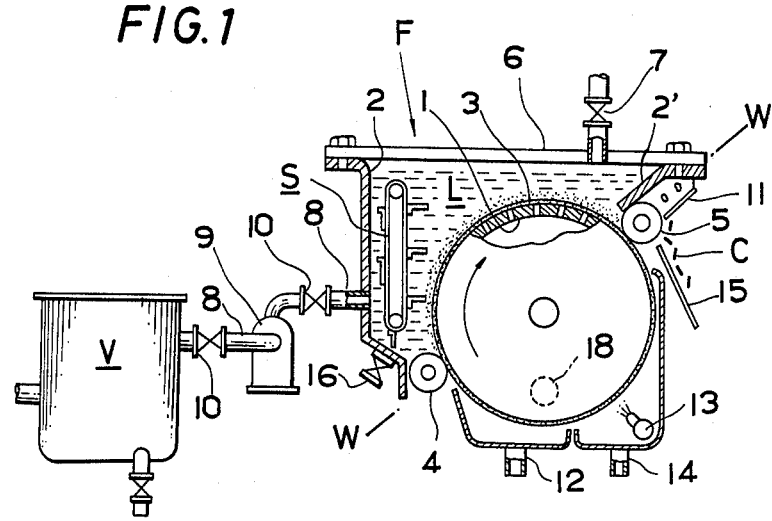
FIG. 1 is a vertical cross-section of a pressure filter which is one embodiment of the present invention.
Figure 2:
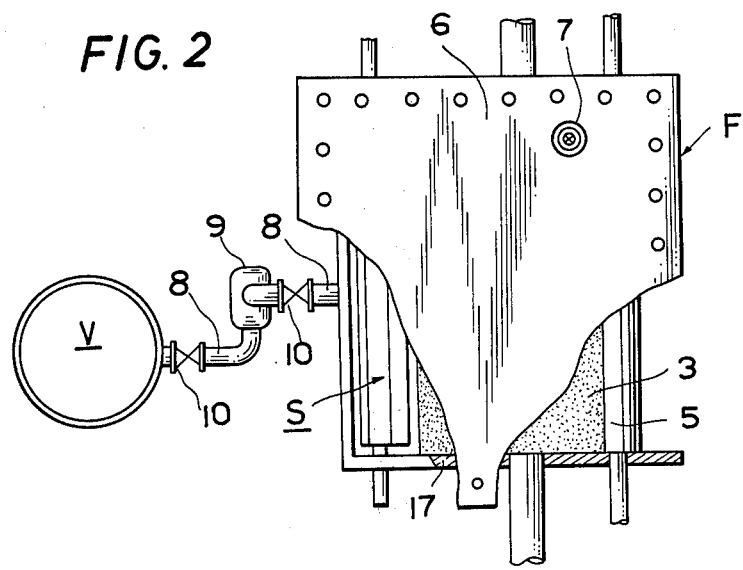
FIG. 2 is a plan view, partially broken away, of the pressure filter shown in FIG. 1.

Referring to FIGS. 1 and 2, a pressure filtering apparatus according to the present invention includes a closed-type vessel F which defines a filtering chamber L. The vessel F includes a vertical sidewall 2 and an inclined sidewall 2', these sidewalls defining the filtering chamber L together with end walls 17 (only one shown). A top opening defined by the upper edges of the side and end walls is closed by a closure or lid 6 which is fastened on the flanges of the upper edges by any suitable fastening means such as bolts and nuts as shown in FIG. 1. As will be apparent hereinafter, the closure 6 is provided with a relief valve 7 for safety. This relief valve may be installed in the sidewall 2, as required.

The sidewall 2 of the vessel F includes a lower portion which is folded or bent inward and has a drain valve 16 for the cleaning or maintenance of the filtering chamber L.

A hollow filter cylinder 1, which includes a plurality of small holes in the peripheral wall thereof, is rotatably mounted in the vessel F in such a way that a portion of the cylinder 1 protudes into the filtering chamber L through the opening of the sidewall 2' to a position within the filtering chamber. The filter cylinder 1 has a filtering surface covered with a filter cloth 3.

At positions diametrically opposed with respect to the filter cylinder 1, squeeze and sealing rolls 4 and 5 are rotatably engaged with the filter cylinder 1 through the filter cloth 3. The sealing roll 4 is also engaged with the lower portion of the sidewall 2 to seal the sidewall and the cylinder. The squeeze roll 5 is also engaged with the outer surface of the sidewall 2' to seal the cylinder and the sidewall 2'. Thus, a sealing and operating wall is defined by the squeeze and sealing rolls and the portion of the filter cylinder along a plane as shown by plane W—W in FIG. 1.

A scraper 11 is located on the sidewall 2' to come in contact with the outer periphery of the squeeze roll 5 so that dewatered cake deposited thereon as described hereinafter will be separated or removed. The removed cake moves onto a chute 15 to be collected by any suitable collecting means.

The portion of the filter cylinder 1 which is positioned outside the filtering chamber L is covered with a basin which is divided into two portions. One of the two basin portions is designed to receive filtrate from the filter cylinder 1 and provided with a drain pipe for the filtrate. The other basin portion is provided with a washing nozzle 13 for cleaning the filter cloth 3, which nozzle is positioned within the other basin portion to be directed toward the filter cylinder 1. The nozzle may be located within the filter cylinder in any suitable manner. The other basin portion has also a drain pipe 14 for discharging the used washing liquid.

Figure 11:
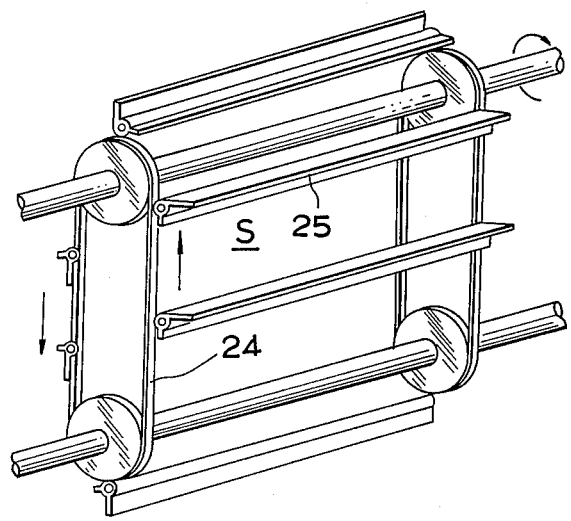
FIG. 11 is a perspective view showing in larger scale the agitator illustrated in FIGS. 1, 5 and 6.

The filtering chamber L includes an agitating means S positioned therewithin which consists of two parallel shafts rotatably journalled in the end walls 17 as shown in FIG. 2. As seen in FIG. 11, each of the shafts has two pulleys axially spaced from each other. The opposed pulleys on the parallel shafts are connected to each other by means of respective belts 24. A plurality of agitating plates 25 extend between the belts 24, each of the plates being pivotally mounted at each end on the respective belt 24. When one of the shafts is rotated by means of any suitable drive means (not shown), the belts 24 are moved in a direction as shown by arrows in FIG. 11. At this time, the agitating plates 25 are positioned vertically with respect to the longitudinal axis of the belt during the upward run thereof and retracted parallel to the axis of the belt during the downward run. Thus, an upward flow is mainly produced in the filtering chamber L by means of the agitating means S to homogenize raw slurry which is fed into the filtering chamber as described hereinafter. In the opposite side, that is, the downward run of the belts 24, there is a slight downward flow which does not substantially contribute to the homogenization of slurry.

Original slurry to be filtered is supplied from a slurry tank V to the vessel F through duct means which consists of pipes 8 connected respectively with the tank V or vessel F, valves 10 on the respective pipes 8 and a pressure pump 9 connecting the other ends of the respective pipes 8 between the valves 10. The pressure pump 9 is operative in feeding the raw slurry from the slurry tank V to the filtering chamber L of the vessel through the pipes 8 and the valves 10 at a predetermined pressure. The pressure pump 9 may be of the conventional type such as diaphragm type, roots-rotor type, plunger type, impeller type or the like. Preferably, the pressure pump is automatically controlled to respond to the pressure or water level in the filtering chamber.

The raw slurry in the filtering chamber is continuously separated under a predetermined pressure at the filtering surface of the filter cylinder 1 into filtrate and filter cake. The filter cake C is increased in thickness as the filter cylinder is rotated in the direction as shown by an arrow in FIG. 1, and pressed at the squeezing roll 5 to be transferred from the filter cylinder 1 to the squeeze roll 5. The resultant dewatered cake is continuously separated from the squeeze roll 5 by means of the scraper 11 and discharged onto the chute 15. The filtrate is discharged from the basin through the drain pipe 12. However, the filtrate may be removed from the basin through a drain port 18 which may be installed in the end wall 17 of the vessel F.

In accordance with the process and apparatus of the present invention, the filtering pressure is used in the range of 0.5 kg/cm$^2$ to 5 kg/cm$^2$, preferably 0.5 kg/cm$^2$ to 3.0 kg/cm$^2$. For example, the filtering pressure of 2 kg/cm$^2$ provides percentages of water content of 70–75% in paper mill sewage sludges, 50–55% in coagulated sludges containing bentonite as a coagulant, 38–50% in sewage sludges produced in grinding steel balls, and 63–70% in activated sludges.

Figure 3:
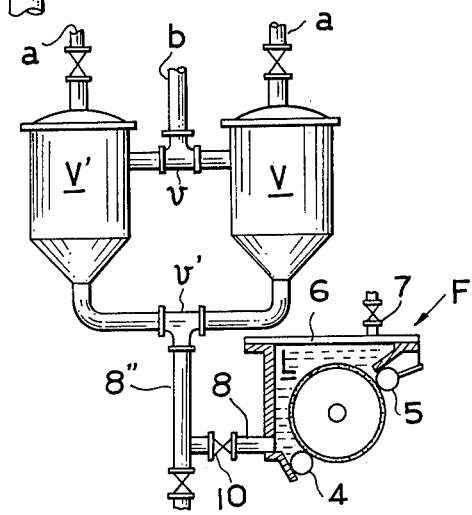
FIG. 3 is a view similar to FIG. 1, showing a pressure filter which is a second embodiment of the present invention.

FIG. 3 shows another embodiment of the present invention in which two slurry tanks V and V' are connected with the filtering chamber L of the vessel F through the pipes 8 and 8" and valve 10 without the use of any pressure pump. The slurry tanks are connected with each other through two switching valves v and v', the valve v being connected to a slurry supplying pipe b and the valve v' being connected to the pipe 8". These switching valves are arranged such that one of the tanks is fed with raw slurry from the supplying pipe b while the other tank is connected with the filtering chamber L through the pipes 8" and 8 and the valve 10. The slurry in the other tank is fed to the filtering chamber by means of compressed air which is supplied to that tank through a pipe a. When the other slurry tank is exhausted, the valve v and v' are switched so as to connect the filtering chamber with the one slurry tank which has already been filled with the raw slurry from the slurry supplying pipe b.

Figure 4:
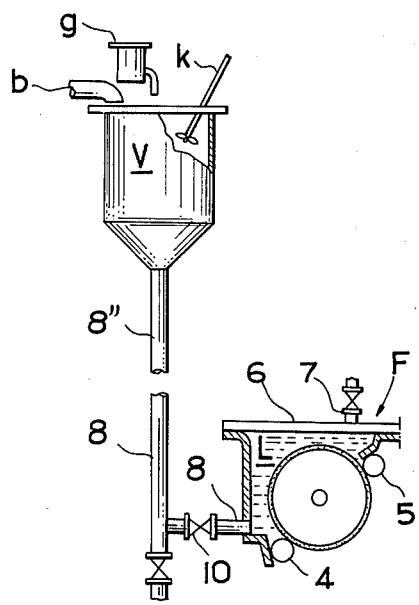
FIG. 4 is a view similar to FIG. 3, showing a pressure filter which is a third embodiment of the present invention.

An embodiment, shown in FIG. 4, includes a slurry tank V which is positioned at a level higher than that of the filtering chamber L by at least 10 meters. Thus, the raw slurry is fed from the tank to the filtering chamber by means of water pressure. The tank is adapted to receive the raw slurry from the supplying pipe b and stir it by means of an agitator K. Moreover, any type of coagulant may be added to the slurry in the tank V from a coagulant tank g. The added coagulant is mingled with the slurry in the tank by means of the agitator K to form coagulated flakes. Since the slurry is fed from the tank to the filtering chamber under head of water in the arrangement as shown in FIG. 4, the flakes can be supplied to the filtering surface of the filter cylinder without breakage.

Figure 5:
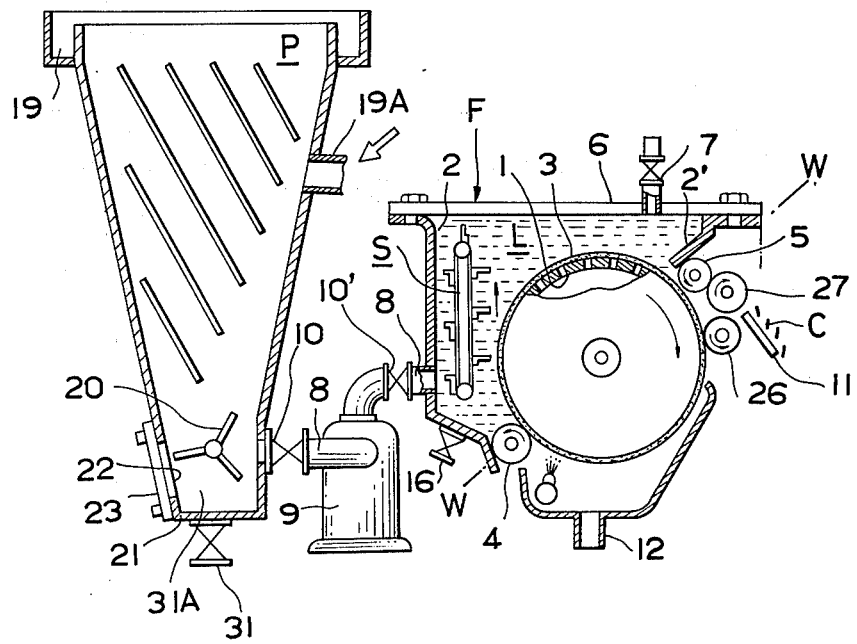
FIG. 5 is a view showing a pressure filter which is a fourth embodiment of the present invention.

FIG. 5 shows an embodiment of the present invention in which a settling tank P is used instead of the slurry tank V. Original slurry is fed to the settling tank through an inlet pipe 19A, and the resultant supernatant water overflows into a trough 19 around the upper edge of the settling tank P and is discharged in any suitable manner.

Figure 10:
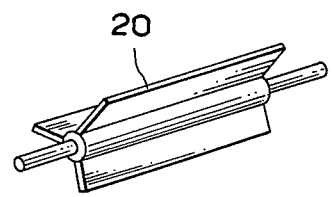
FIG. 10 is a perspective view of an agitator used in the embodiment shown in FIG. 5.

At the bottom of the settling tank, an agitator 20 is located adjacent to the inlet of the pipe 8. For example, the agitator 20 consists of a hub on a rotating shaft and three agitating plates mounted on the hub and disposed angularly from one another by an angle of 120°, as shown in FIG. 10. The agitator 20 stirs the sludge that has settled and thickened in the bottom of the settling tank so that it can easily be fed from the settling tank to the filtering chamber through the pipe 8 and valves 10 by means of the pressure pump 9.

The settling tank includes an access 22 formed at the bottom thereof for cleaning or maintenance and a closure 23 fastened over the access 22. A drain valve 31 also is provided at the bottom of the settling tank. The settling tank is also provided with a catch-basin 31A for any foreign matter of relatively heavy weight. The catch-basin 31A is positioned at a level below the inlet of the pipe 8. It is preferable that the agitator 20 be positioned slightly above the catch-basin 31A. However, such a catch-basin may be installed in the duct 8 at a position lower than the level of flow.

The pressure filtering system shown in FIG. 5 includes a press roll 26 which is engaged by the filter cylinder 1 below the contact area of the squeeze roll 5 and the cylinder 1, and another press roll 27 which is engaged by both the squeeze and first press rolls 5, 26. With such an arrangement, the separation of filter and dewatered cakes from the filter cylinder can be greatly improved, and the water content of the dewatered cake can be reduced.

The sealing and squeezing rolls 4, 5 which define the sealing and operating wall together with the filter cylinder 1 are positioned on a horizontal operation plane W—W and also engaged by the sidewalls 2 and 2', respectively.

This pressure filter utilizes a filter cloth 3 which has a length extending beyond the perimeter of the filter cylinder. The excess portion of the filter cloth 3 is drawn out between the sealing and squeezing rolls 4 and 5 and passed over a tension roll 30. Two washing nozzles 13 are located outside the filtering chamber L for directing the washing liquid toward the opposite sides of the filter cloth 3. The used washing liquid is discharged from the basin through the drain pipe 12.

Figure 6:
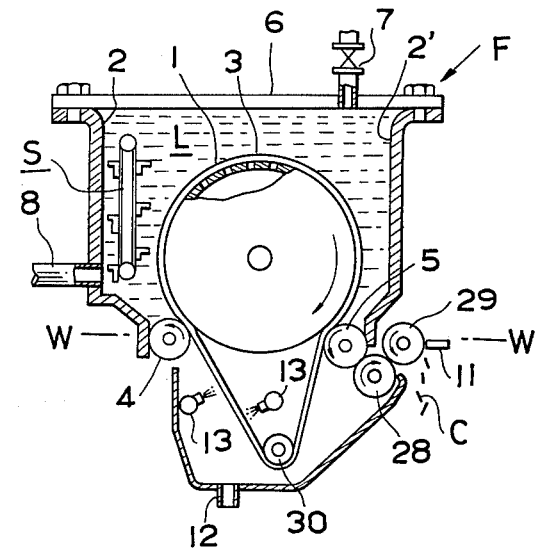
FIG. 6 is a view similar to FIG. 5, showing a pressure filter which is a fifth embodiment of the present invention.

The pressure filter in FIG. 6 also includes an intermediate roll 28 engaged with the squeeze roll 5 and a press roll 29 engaged with the intermediate roll 28. In such an arrangement, the filter cake can be squeezed three times through three pressing rolls so that the resultant dewatered cake will have a very low percentage of water content.

Figure 7:
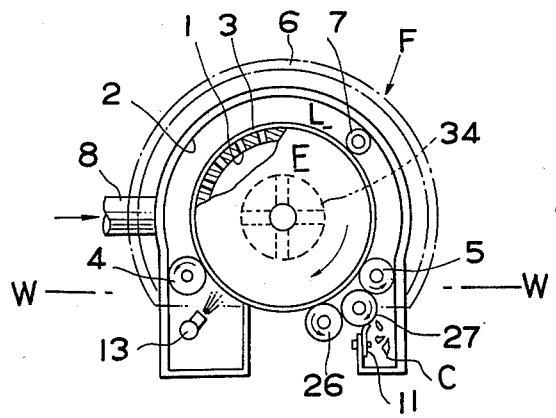
FIG. 7 is a horizontal cross-section showing a seventh embodiment of the present invention.
Figure 8:
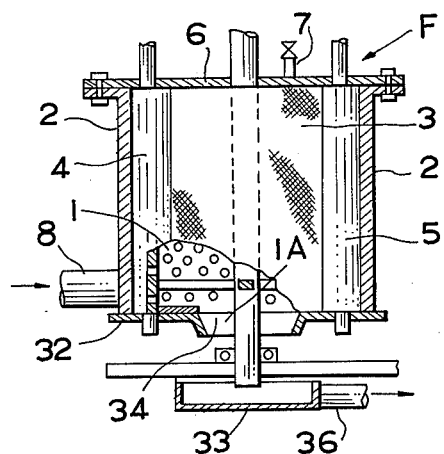
FIG. 8 is a vertical cross-section of the embodiment shown in FIG. 7 taken along the lines W—W.

In the embodiment, of FIGS. 7 and 8, there is shown a pressure filter similar to that of FIG. 5 except that the axes of the vessel F and the filter cylinder 1 are vertical. Namely, the sealing operating plane W—W is perpendicular to a horizontal plane. Consequently, the filter cylinder 1 includes a lower end plate having an opening 1A which is aligned with a discharging port 34 in the bottom plate 32 of the vessel. Below the port 34 of the vessel there is located a basin 33 for receiving the filtrate from the vessel F. The filtrate in the basin 33 will be exhausted through a pipe 36.

Figure 9:
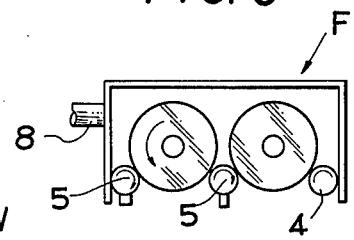
FIG. 9 is a schematic, cross-sectional view showing a modification of the embodiment shown in FIGS. 7 and 8.

With such an arrangement, the amount of filtrate can be exhausted from the filtering chamber through the openings 1A and 34 so that the efficiency of the filtering operation will be increased. Moreover, a plurality of filter cylinders can be disposed within the filtering chamber as shown in FIG. 9 in order to further increase filtering efficiency.

Although the preferred embodiments of the present invention have been described by the accompanying drawings, many modifications and variations can be carried out by those skilled in the art without departing from the scope and spirit of the invention as defined in the appended claims.

I claim:

1. A process for continuous pressure filtration comprising rotating at least one perforated filter cylinder in a vessel so that at least a portion of the filter cylinder defines in part a filtering chamber and another part of the filtering chamber is defined by said vessel, said filter cylinder having a filtering surface covered with a filter medium, sealing said filtering chamber in at least two locations by at least two sealing and squeezing rolls between said filter cylinder and the walls of said vessel, disposing each of said sealing and squeezing rolls at a position at least partially below the upper level of said filtering chamber, supplying raw slurry under pressure to said filtering chamber, effecting pressure filtration through said filter medium on said filter cylinder, continuously removing filter cake from the filter cylinder by utilizing at least one of said sealing and squeezing rolls, discharge said filter cake externally of said filtering chamber, and removing the filtered liquid from the inside of said filter cylinder.

2. The process as defined in claim 1, comprising maintaining said filter chamber under pressure during the filtering process.

3. The process as defined in claim 2, wherein said pressure is within the range of 0.5 $kg/cm^2$ to 5.0 $kg/cm^2$.

4. The process as defined in claim 2, wherein said pressure is within the range of 0.5 $kg/cm^2$ to 3.0 $kg/cm^2$.

5. The process as defined in claim 1, comprising removing said filtered liquid by causing the latter to flow to the longitudinal end of said filter cylinder.

6. The process as defined in claim 1, comprising removing said filtered liquid by causing the latter to flow through the perforations of said filter cylinder.

7. The process as defined in claim 1, comprising removing said filtered liquid by gravity flow.

8. A process for continuous pressure filtration comprising rotating at least one perforated filter cylinder about a vertical axis in a vessel so that at least a portion of the filter cylinder defines in part a filtering chamber and another part of the filtering chamber is defined by said vessel, said filter cylinder having a filtering surface covered with a filter medium, sealing said filtering chamber in at least two locations by at least two sealing and squeezing rolls rotatable about vertical axes between said filter cylinder and the walls of said vessel, supplying raw slurry under pressure to said filtering chamber, effecting pressure filtration through said filter medium on said filter cylinder, continuously removing filter cake from the filter cylinder by utilizing at least one of said sealing and squeezing rolls, discharge said filter cake externally of said filtering chamber, and removing the filtered liquid from the inside of said filter cylinder.

9. A process according to claim 8 wherein said filter cylinder has an opening at its lower end, and further comprising removing filtered liquid from the inside of said filter cylinder by gravity as said filtered liquid flows by gravity through said opening.

10. A process according to claim 9 further comprising discharging said filter cake by gravity as said filter cake falls after removal of said filter cake from said filter cylinder by said sealing and squeezing rolls.

11. Apparatus for continuous pressure filtration comprising a closed-type filter vessel defining in part a filtering chamber, at least one perforated filtering cylinder rotatably mounted in said vessel such that a portion of said filtering cylinder extends into said filtering chamber and the remaining portion extends externally of said filtering chamber, means for rotating said filtering cylinder, said filtering cylinder having a filtering surface covered with a filter medium, at least two sealing and squeezing roller means rotatably mounted on said vessel and each in contact at different locations with said filter medium on said filtering cylinder and in contact with said vessel, each of said sealing and squeezing roller means being disposed and arranged such that said contact with said filter medium and said vessel provides a closed and sealed filtering chamber which is operable to receive under pressure slurry to be filtered, each of said different contact locations between said sealing and squeezing roller means and said filter medium being disposed, at least partially, below the upper level of said sealed filtering chamber, said filter medium transferring filter cake to said sealing and squeezing roller means, supply means for supplying under pressure said slurry to be filtered to said closed and sealed filtering chamber, said supply means comprising at least one slurry tank and a duct means connecting said slurry tank to said filtering chamber, cake discharging means located externally of said filtering chamber for discharging filter cake from said sealing and squeezing roller means, and outlet means for exhausting filtered liquid which passes through said filter medium and the perforated filtering cylinder.

12. The apparatus as defined in claim 11, wherein there are a plurality of filtering cylinders in one filtering chamber, each of said filtering cylinders being provided with a respective sealing and squeezing roller means.

13. The apparatus as defined in claim 11, wherein said outlet means comprises a basin means disposed externally of said filtering chamber, said basin means receiving filtered liquid from said filtering cylinder.

14. The apparatus as defined in claim 13, wherein said filtering chamber is defined by the uppermost part of said filtering cylinder, and said basin means is disposed below said filtering chamber such that flow of filtered liquid from the inside of said filtering cylinder to said basin means is facilitated by gravity.

15. The apparatus as defined in claim 14, wherein said basin means has disposed therein a washing nozzle for cleaning said filter medium.

16. The apparatus as defined in claim 11, wherein said at least two sealing and squeezing roller means comprises at least two squeezing and sealing rollers disposed below the level of the uppermost part of said filtering cylinder, said filtering chamber being defined in part by said uppermost part of said filtering cylinder.

17. The apparatus as defined in claim 16, wherein a lid is disposed on top of said vessel, said lid defining a part of said filtering chamber.

18. The apparatus as defined in claim 11, wherein said filtering cylinder and each of said sealing and squeezing roller means are mounted for rotation about vertical axes.

19. The apparatus as defined in claim 18, wherein the lower longitudinal end of said filtering cylinder has a central opening through which filtered liquid passes out from said filtering cylinder.

20. The apparatus as defined in claim 11, wherein said filtering cylinder and each of said sealing and squeezing roller means are mounted for rotation about horizontal axes.

21. Apparatus for continuous pressure filtration comprising a closed-type filter vessel defining in part a filtering chamber, at least one perforated filtering cylinder mounted in said vessel for rotation about a vertical axis and disposed such that a portion of said filtering cylinder extends into said filtering chamber and the remaining portion extends externally of said filtering chamber, means for rotating said filtering cylinder, said filtering cylinder having a filtering surface covered with a filter medium, at least two sealing and squeezing roller means rotatably mounted on said vessel for rotation about vertical axes and each in contact at different locations with said filter medium on said filtering cylinder and in contact with said vessel, each of said sealing and squeezing roller means being disposed and arranged such that said contact with said filter medium and said vessel provides a closed and sealed filtering chamber which is operable to receive under pressure slurry to be filtered, said filter medium transferring filter cake to said sealing and squeezing roller means, supply means for supplying under pressure said slurry to be filtered to said closed and sealed filtering chamber, cake removing means located externally of said filtering chamber for removing filter cake from said sealing and squeezing roller means, and outlet means for exhausting filtered liquid which passes through said filter medium and the perforated filtering cylinder.

22. The apparatus as defined in claim 21, wherein there are a plurality of filtering cylinders in one filtering chamber, each of said filtering cylinders being provided with a respective sealing and squeezing roller means.

23. The apparatus as defined in claim 21, wherein said outlet means comprises a basin means disposed externally of said filtering chamber, said basin means receiving filtered liquid from said filtering cylinder.

24. The apparatus as defined in claim 21, wherein the lower longitudinal end of said filtering cylinder has a central opening through which filtered liquid passes out from said filtering cylinder.

25. Apparatus for continuous pressure filtration comprising a closed-type filter vessel defining in part a filtering chamber, at least one perforated filtering cylinder mounted in said vessel for rotation about a horizontal axis and disposed such that a portion of said filtering cylinder extends into said filtering chamber and the remaining portion extends externally of said filtering chamber, means for rotating said filtering cylinder, said filtering cylinder having a filtering surface covered with a filter medium, at least two sealing and squeezing roller means rotatably mounted on said vessel for rotation about horizontal axes and each in contact at different locations with said filter medium on said filtering cylinder and in contact with said vessel, each of said sealing and squeezing roller means being disposed and arranged such that said contact with said filter medium and said vessel provides a closed and sealed filtering chamber which is operable to receive under pressure slurry to be filtered, said filter medium transferring filter cake to said sealing and squeezing roller means, supply means for supplying under pressure said slurry to be filtered to said closed and sealed filtering chamber, cake removing means located externally of said filtering chamber for removing filter cake from said sealing and squeezing roller means, and outlet means for exhausting filtered liquid which passes through said filter medium and the perforated filtering cylinder.

* * * * *